United States Patent
Otsuka

(10) Patent No.: US 8,880,742 B2
(45) Date of Patent: Nov. 4, 2014

(54) COMMUNICATION DEVICES THAT SEND WEB PAGES AND COMPUTER READABLE MEDIA COMPRISING INSTRUCTIONS FOR CONTROLLING SUCH COMMUNICATION DEVICES

(75) Inventor: Naoki Otsuka, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 430 days.

(21) Appl. No.: 13/431,060

(22) Filed: Mar. 27, 2012

(65) Prior Publication Data

US 2012/0284430 A1    Nov. 8, 2012

(30) Foreign Application Priority Data

May 6, 2011    (JP) .................................. 2011-103736

(51) Int. Cl.
- *G06F 3/00* (2006.01)
- *H04L 29/00* (2006.01)
- *H04L 29/08* (2006.01)

(52) U.S. Cl.
CPC .............. *H04L 29/00* (2013.01); *H04L 67/306* (2013.01); *H04L 67/02* (2013.01)
USPC ............................................................ 710/4

(58) Field of Classification Search
CPC .............................. H04L 67/02; H04L 67/306
USPC ............................................................ 710/4
See application file for complete search history.

(56) References Cited

U.S. PATENT DOCUMENTS

| 8,151,323 B2 * | 4/2012 | Harris et al. ...................... 726/4 |
| 2007/0244987 A1 * | 10/2007 | Pedersen et al. ............... 709/217 |

FOREIGN PATENT DOCUMENTS

JP    2002-300161 A    10/2002

* cited by examiner

*Primary Examiner* — Titus Wong
(74) *Attorney, Agent, or Firm* — Baker Botts L.L.P.

(57) ABSTRACT

A communication device includes a receiver, a command supplying device, an information transmitter, and a web-page transmitter. The receiver receives requests from an external device. The command supplying device determines that a request including a first address including a specific host name is a first request. The command supplying device transmits a command, including an instruction to transmit a second request, to the external device when the first request is received. The command supplying device determines that a request including a second address including a specific IP address is a second request. The information transmitter transmits information to the external device when the second request is received. A combination of the specific IP address and a cookie is stored on the external device when the information is received. The web-page transmitter transmits web page data to the external device when the second request is received.

10 Claims, 9 Drawing Sheets

Fig.2
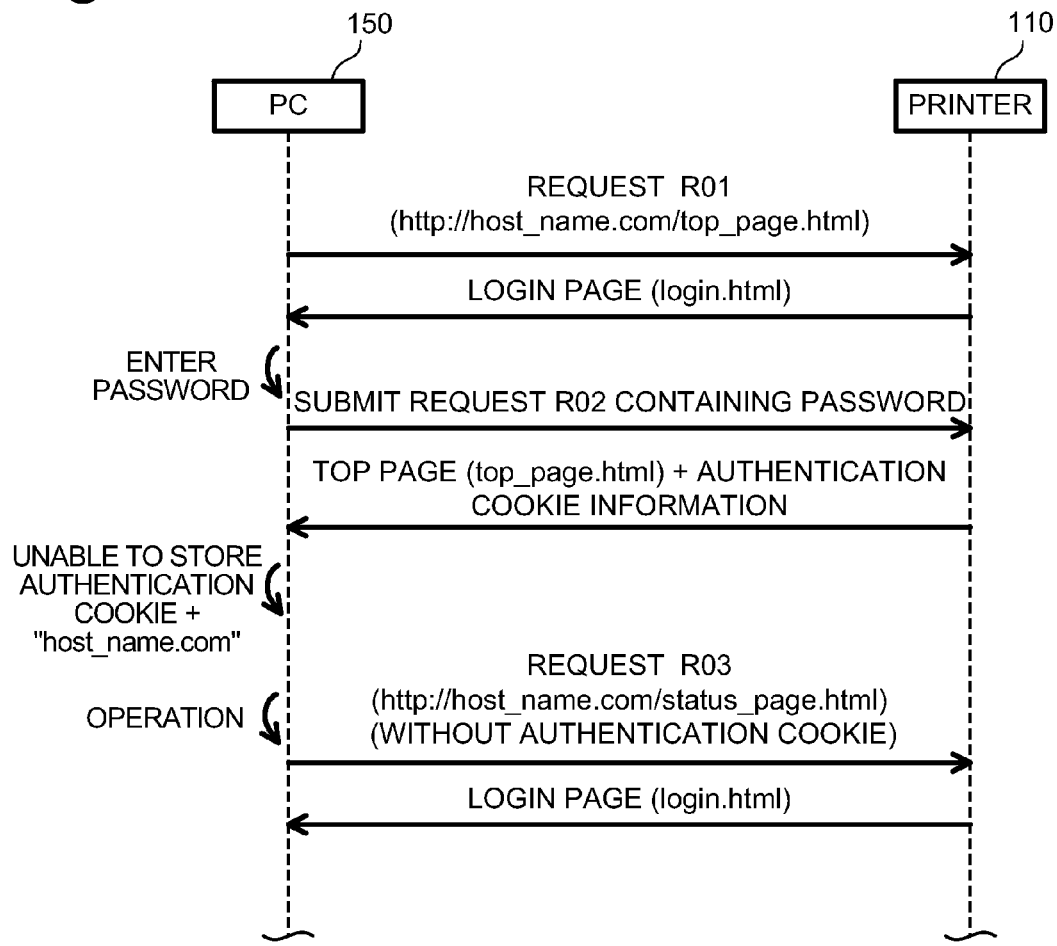
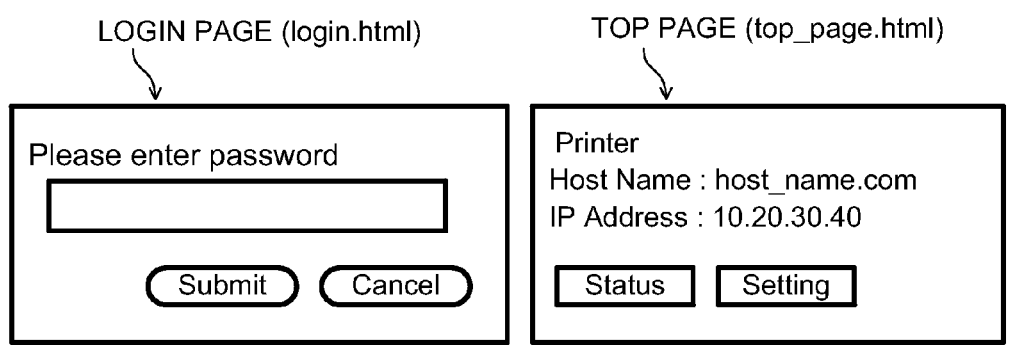

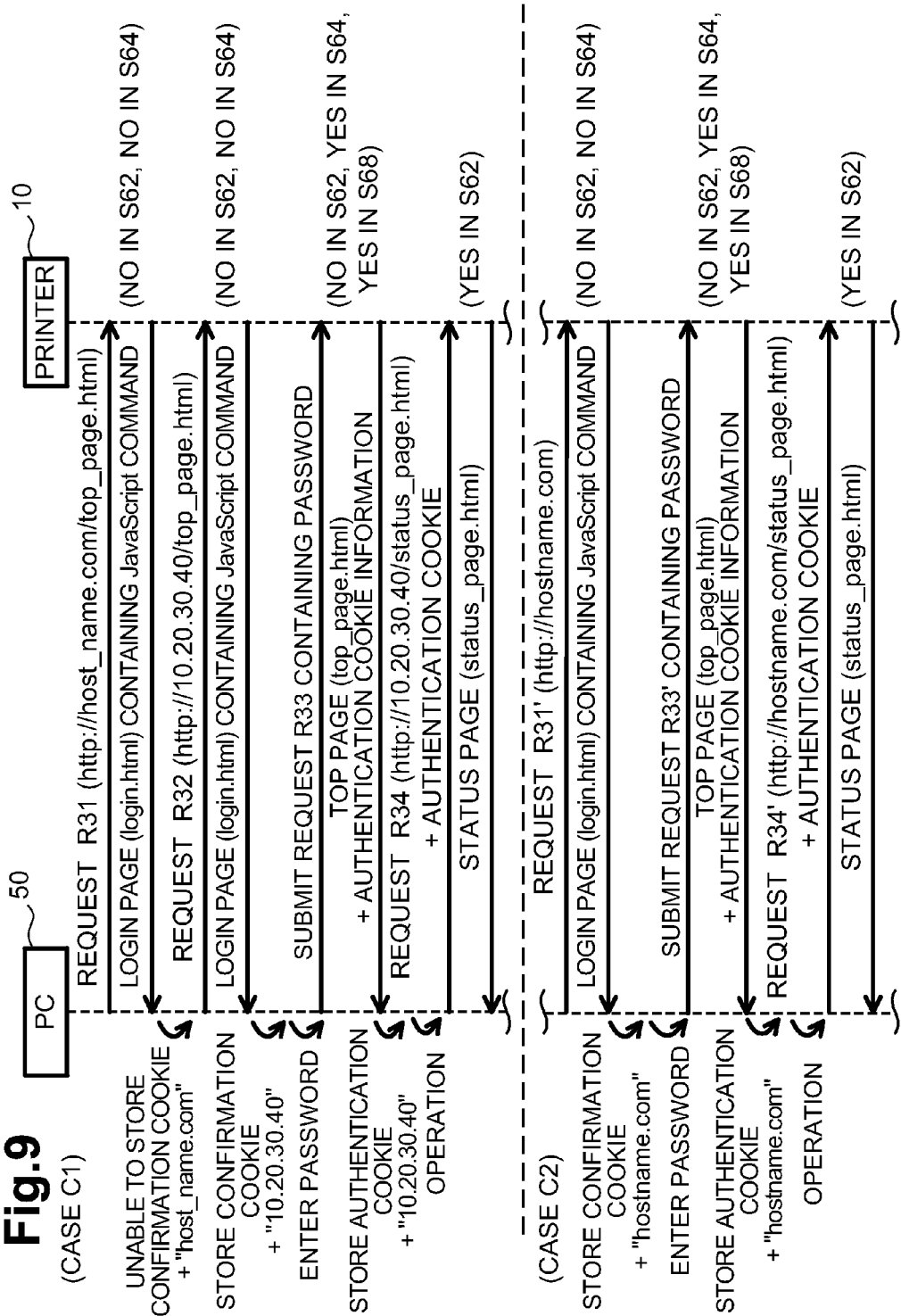

COMMUNICATION DEVICES THAT SEND WEB PAGES AND COMPUTER READABLE MEDIA COMPRISING INSTRUCTIONS FOR CONTROLLING SUCH COMMUNICATION DEVICES

CROSS-REFERENCE TO RELATED APPLICATION

The present application claims priority from Japanese Patent Application No. 2011-103736, filed on May 6, 2011, which is incorporated herein by reference.

BACKGROUND OF THE INVENTION

1. Field of the Invention

The invention relates to communication devices that transmit web pages to an external device in accordance with a request received from the external device and computer-readable media storing instructions for controlling such communication devices.

2. Description of Related Art

A known host computer transmits web pages in accordance with the hypertext transfer protocol ("HTTP"). In the HTTP, an address containing a host name or an Internet protocol ("IP") address of the host computer is used as an address for requesting a web page.

SUMMARY OF THE INVENTION

Cookies may be used during web page communication between a host computer and a client computer. A cookie may be an amount of data that provides information associated with a communication process. When cookie information (e.g., information comprising a cookie, such as a predetermined character string, and a path along which the cookie may be used) is not properly stored on the client computer, management of information about the web page may not be executed properly. Embodiments of the present invention provide techniques which enable cookies to be properly stored on a client computer.

A communication device disclosed herein may comprise a processor and a memory. The memory may be configured to store computer-readable instructions thereon. The computer-readable instructions may instruct the processor to operate as a receiving device, a command supplying device, an information transmitting device, and a web-page transmitting device. The receiving device may be configured to receive a request from an external device. The command supplying device may be configured to determine that a request received by the receiving device is a first request when the request comprises a first address designated as an address for requesting a first web page and the first address comprises a specific host name assigned to the communication device. The command supplying device may be further configured to transmit a first command to the external device when the receiving device receives the first request from the external device and a first condition is satisfied. The first command may comprise an instruction for the external device to transmit a second request to the communication device when a second condition is satisfied. The command supplying device may be further configured to determine that a request received by the receiving device is the second request when the request comprises a second address designated as an address for requesting the first web page and the second address comprises a specific IP address assigned to the communication device. The information transmitting device may be configured to transmit first information to the external device when the receiving device receives the second request from the external device and a third condition is satisfied. A combination of the specific IP address and a first cookie may be stored on the external device when the first information is received from the communication device. The web-page transmitting device may be configured to transmit first data representing the first web page to the external device when the receiving device receives the second request from the external device.

With the configuration described above, when the receiving device receives a first request designating a first address comprising a specific host name of a communication device from an external device, the communication device may instruct the external device to transmit a second request designating a second address comprising a specific IP address of the communication device. When the receiving device receives the second request from the external device, the communication device may transmit first information to the external device, such that a combination of the specific IP address and a first cookie is stored on the external device. Therefore, even when a combination of the specific host name and the first cookie may not be stored on the external device, the combination of the specific IP address and the first cookie may be stored on the external device. Thus, the first cookie may be stored properly on the external device.

A non-transitory, computer-readable storage medium disclosed herein may store computer-readable instructions for a processor of a communication device thereon. The computer-readable instructions may instruct the processor to perform several steps. The computer-readable instructions may instruct the processor to perform a step of receiving a request from an external device. The computer-readable instructions may instruct the processor to perform a step of determining that a request received from an external device is a first request when the request comprises a first address designated as an address for requesting a web page and the first address comprises a specific host name assigned to the communication device. The computer-readable instructions may instruct the processor to perform a step of transmitting a command to the external device when the first request is received from the external device. The command may comprise an instruction for the external device to transmit a second request to the communication device. The computer-readable instructions may instruct the processor to perform a step of determining that a request received by the receiving device is the second request when the request comprises a second address designated as an address for requesting the web page and the second address comprises a specific IP address assigned to the communication device. The computer-readable instructions may instruct the processor to perform a step of transmitting information to the external device when the second request is received from the external device. The computer-readable instructions may instruct the processor to perform a step of transmitting data representing the web page to the external device when the second request is received from the external device. A combination of the specific IP address and a cookie may be stored on the external device when the information is received from the communication device.

A communication device disclosed herein may comprise a receiver, a command supplying device, an information transmitter, and a web-page transmitter. The receiver may be configured to receive a request from an external device. The command supplying device may be configured to determine that a request received by the receiver is a first request when the request comprises a first address designated as an address for requesting a web page and the first address comprises a specific host name assigned to the communication device.

The command supplying device may be further configured to transmit a command to the external device when the receiver receives the first request from the external device. The command may comprise an instruction for the external device to transmit a second request to the communication device. The command supplying device may be further configured to determine that a request received by the receiver is a second request when the request comprises a second address designated as an address for requesting the web page and the second address comprises a specific IP address assigned to the communication device. The information transmitter may be configured to transmit information to the external device when the receiver receives the second request from the external device. A combination of the specific IP address and a cookie may be stored on the external device when the information is received from the communication device. The webpage transmitter may be configured to transmit data representing the web page to the external device when the receiver receives the second request from the external device.

Other objects, features, and advantages will be apparent to persons of ordinary skill in the art from the following detailed description of embodiments of the invention and the accompanying drawings.

BRIEF DESCRIPTION OF THE DRAWINGS

For a more complete understanding of the present invention, needs satisfied thereby, and the objects, features, and advantages thereof, reference now is made to the following descriptions taken in connection with the accompanying drawings.

FIG. 2 is a sequence diagram depicting an example of communications according to a comparative example.

FIG. 9 is a sequence diagram depicting examples of communications according to embodiments of FIG. 8, wherein the example is based on Cases C1 and C2 (described below).

DETAILED DESCRIPTION OF EMBODIMENTS OF THE INVENTION

Figure 1:
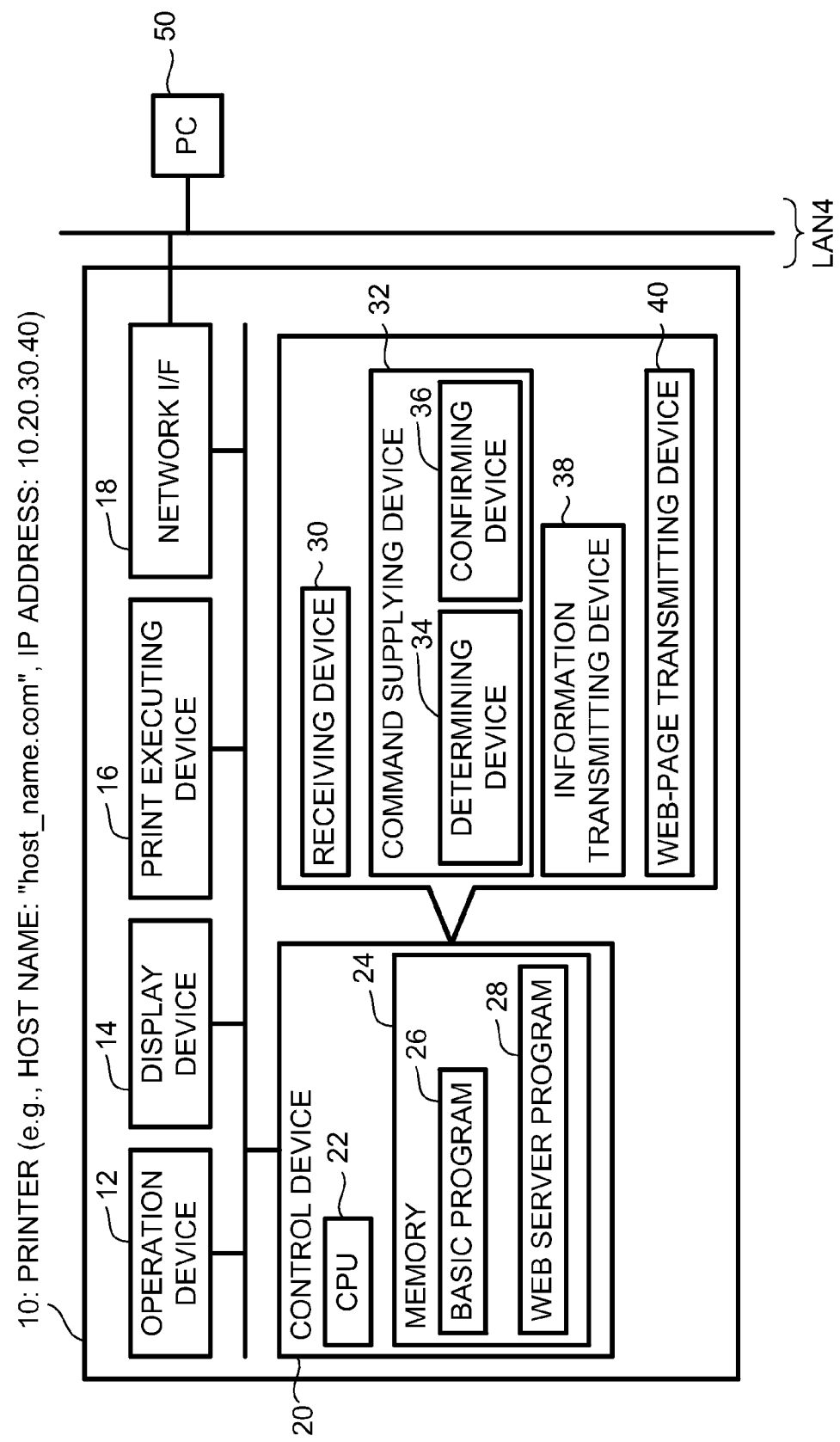
FIG. 1 is a schematic drawing depicting a configuration of a communication system.
Figure 3:
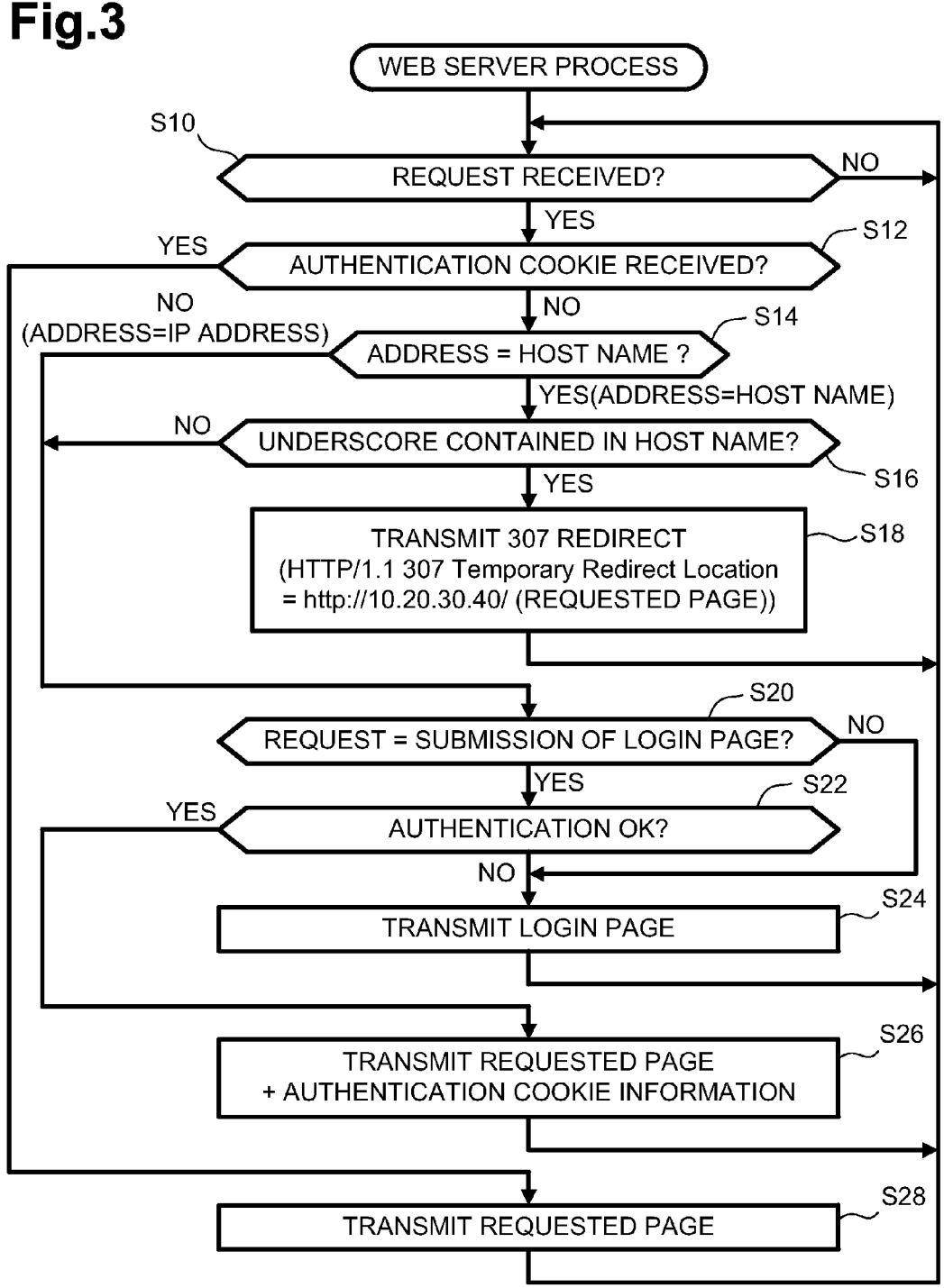
FIG. 3 depicts a flowchart of a web server process according to particular embodiments of the invention.
Figure 4:
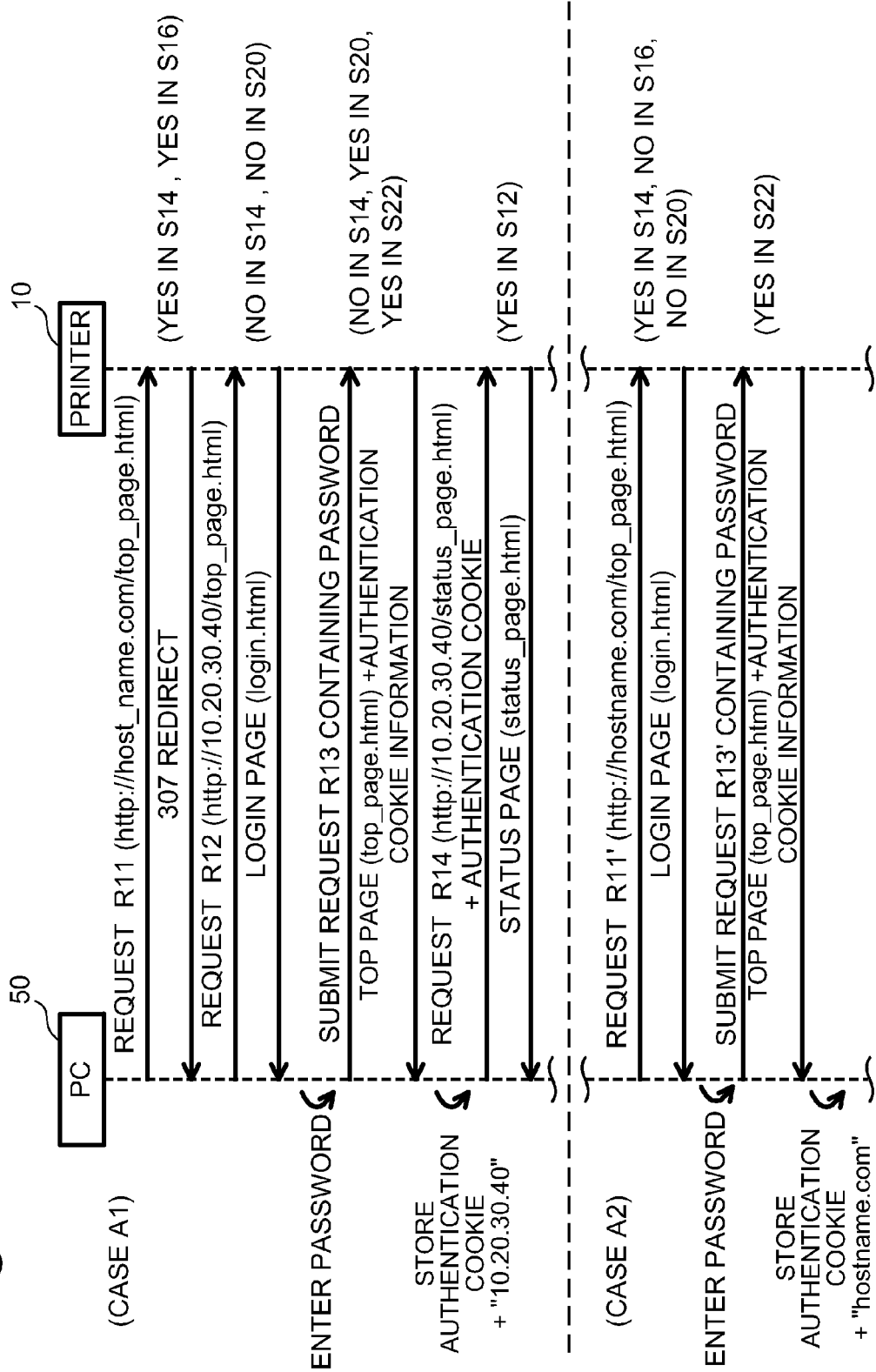
FIG. 4 is a sequence diagram depicting examples of communications according to embodiments of FIG. 3, wherein the examples are based on Cases A1 and A2 (described below).

Embodiments of FIGS. 1, 3, and 4

[Configuration of Systems]

As depicted in FIG. 1, a communication system 2 may comprise a printer 10 and a personal computer ("PC") 50. The printer 10 may be a peripheral for the PC 50. The printer 10 and the PC 50 may communicate with each other through a local area network ("LAN") 4.

[Configuration of the Printer 10]

The printer 10 may comprise an operation device 12, a display device 14, a print executing device 16, a network interface ("I/F") 18, and a control device 20. The components 12, 14, 16, 18, and 20 may connect to a bus line (not depicted with a reference numeral). The operation device 12 may comprise a plurality of keys. The user may provide various instructions to the printer 10 by operating the operation device 12. The display device 14 may be a display for displaying various kinds of information. The print executing device 16 may comprise, for example, an inkjet printing mechanism or a laser printing mechanism and may execute printing according to an instruction from the control device 20. The network interface 18 may connect to a local area network ("LAN") 4.

The control device 20 may comprise a central processing unit ("CPU") 22 and a memory 24. The CPU 22 may execute various processes in accordance with a basic program 26 and a web server program 28, each of which may be stored in the memory 24. The basic program 26 may control the printer 10 to perform basic operations (e.g., an operation for printing and an operation for display on the display device 14). The web server program 28 may control the printer 10 to provide web pages according to requests received from an external device (e.g., the PC 50).

The CPU 22 may execute a process according to the web server program 28, such that the CPU 22 may function as one or more of a receiving device 30, a command supplying device 32, an information transmitting device 38, and a webpage transmitting device 40. The command supplying device 32 may comprise a determining device 34 in particular embodiments, and the command supplying device 32 may comprise a confirming device 36 in other embodiments, as described below.

A host name and an IP address may be assigned to the printer 10. For example, a character string (e.g., "host_name.com") specified by the user may be assigned as a host name to the printer 10. Also, an IP address (e.g., "10.20.30.40") from a dynamic host configuration server ("DHCP") (not depicted) may be assigned to the printer 10. Alternatively, for example, an IP address specified by the user may be assigned to the printer 10.

[Configuration of the PC 50]

The PC 50 may comprise a CPU, a memory, and a display (each of which is not depicted). A web browser program may be stored in the memory of the PC 50. The CPU of the PC 50 may access the printer 10 in accordance with the web browser program and may receive data representing a web page from the printer 10. Consequently, in the communication system 2, the printer 10 and the PC 50 may function as a web server and a web client, respectively.

[Example Communications of Comparative Example of FIG. 2]

An example of communications between a printer 110 and a PC 150 now is described with reference to FIG. 2. In the example communications depicted in FIG. 2, a host name, such as "host_name.com," and an IP address, such as "10.20.30.40," may be assigned to the printer 110.

When a user of the PC 150 desires to access a web server of the printer 110, the user may initiate a web browser program on the PC 150 and may enter the address of a desired web page, such as "http://host_name.com/top_page.html" (e.g., a top page), on the PC 150. Hereinafter, the address entered may be referred to as a "specific address." This specific address may not contain the IP address of the printer 110, but may contain the host name: "host_name.com" of the printer 110. In the example of FIG. 2, the PC 150 may execute a process for communicating with the printer 110 in accordance with the web browser program, and the printer 110 may execute a process for communicating with the PC 150 in accordance with the web server program.

In the example of FIG. 2, the PC 150 may use the host name: "host_name.com" contained in the specific address to obtain the IP address: "10.20.30.40" of the printer 110 from a domain name system ("DNS") server (not depicted). In a modification to the example, the PC 150 may use the network basic input/output system ("NetBios") to obtain the IP address of the printer 110, or the PC 150 may use a hosts file stored on the PC 150 itself to obtain the IP address of the printer 110. The PC 150 subsequently may use the IP address of the printer 110 to establish a transmission control protocol ("TCP") communication session with the printer 110. In the process described below, this communication session may be used for executing communication between the printer 110 and the PC 150.

The PC 150 subsequently may transmit to the printer 110 a request R01 in which the specific address described above may be designated as an address for requesting a web page (hereinafter referred to as a "request address"). The printer 110 may determine whether an authentication cookie has been received with the request R01. When an authentication cookie has not been received with the request R01, the printer 110 may transmit data representing a login page, such as "login.html," to the PC 150. This may allow the PC 150 to display the login page on a display of the PC 150.

FIG. 2 depicts an example login page. The login page may contain an input field for entering a password. The user may enter a password using a keyboard or another input device of the PC 150 and may select (e.g., click on or tap) a "Submit" button. The PC 150 subsequently may transmit a submit request R02 containing the password to the printer 110.

The user may register a password in the printer 110 in advance. The printer 110 may determine whether the password contained in the submit request R02 matches the password registered in advance. When the password entered matches the registered password, the printer 110 may transmit to the PC 150 data representing the top page (e.g., "top_page.html") corresponding to the request address of the request R01 and authentication cookie information comprising an authentication cookie (e.g., a predetermined character string) and a path along which the authentication cookie may be used. Receiving the data representing the top page may enable the PC 150 to display the top page on the display of the PC 150.

FIG. 2 depicts an example top page. The top page may contain the host name and the IP address of the printer 110. The top page also may contain a "Status" button and a "Setting" button. The user may select the "Status" button, for example, when the user desires to know the status (e.g., an amount of remaining consumables) of the printer 110. The user may select the "Setting" button, for example, when the user desires to change various settings (e.g., default print conditions) of the printer 110.

The PC 150 may attempt to store, in the memory of the PC 150, a combination of the authentication cookie comprised in the authentication cookie information received from the printer 110 and the host name: "host_name.com" of the printer 110 contained in the request R01. Nevertheless, a web browser program may prohibit storing a cookie when a host name associated with the cookie contains an underscore "_." The web browser program used in the PC 150 may be such a web browser program. In the example of communications described above, the PC 150 may be unable to store the authentication cookie, when the host name, such as "host_name.com," contains an underscore.

Therefore, even when the user selects the "Status" button on the top page, the PC 150 may be unable to transmit the authentication cookie to the printer 110, when transmitting to the printer 110 a request R03 that contains the address of a status page (e.g., "http://host_name.com/status_page.html") as a request address. Because the authentication cookie may not be received, the printer 110 again may transmit data representing the login page, such as "login.html," to the PC 150. Consequently, the user of the PC 150 again must enter the password. As a result of this process, the user of the PC 150 must enter the password each time a request for a web page is transmitted. Accordingly, in the example of communications described above, in which the PC 150 may not be able to store the authentication cookie, it may be impossible to execute proper communication using the authentication cookie. Nevertheless, embodiments according to FIGS. 1, 3, and 4 and other such embodiments may overcome such problems.

[Web Server Process]

With reference to FIG. 3, a description of a web server process executed by the control device 20 of the printer 10 now is provided. The web server process may be executed in accordance with the web server program 28. In the example of FIG. 3, the printer 10 and the PC 50 may communicate therebetween.

In Step S10, the receiving device 30 (depicted in FIG. 1) may monitor reception of a request from the PC 50. When the receiving device 30 receives a request (YES in Step S10), the process may proceed to Step S12, in which the determining device 34 (depicted in FIG. 1) may determine whether an authentication cookie has been received with the request. When the authentication cookie has not been received with the request (NO in Step S12), the process may proceed to Step S14. When the authentication cookie has been received with the request (YES in Step S12), the process may proceed to Step S28.

In Step S14, the determining device 34 may determine whether a host portion of a request address of the request received in Step S10 comprises one of a host name of the printer 10 and an IP address of the printer 10. The host portion may be a portion of the request address between the characters: "http://" or "https://" and a subsequent character: "/". For example, when the request address is "http://host_name.com/ . . . ," in which the host portion, such as "host_name.com," comprises a host name, the determining device 34 may make a positive determination in Step S14 (YES in Step S14), and the process may proceed to Step S16. For example, when the request address is "http://10.20.30.40/ . . . ," in which the host portion, such as "10.20.30.40," comprises an IP address, the determining device 34 may make a negative determination in Step S14 (NO in Step S14), and the process may proceed to Step S20.

In Step S16, the determining device 34 may determine whether the host name contains an underscore. For example, when the host name is "host_name.com," the determining device 34 may make a positive determination in Step S16 (YES in Step S16) and the process may proceed to Step S18. Thus, when the host name is "hostname.com," the determining device 34 may make a negative determination in Step S16 (NO in Step S16), and the process may proceed to Step S20.

In Step S18, the command supplying device 32 may supply (e.g., transmit) a 307 redirect command to the PC 50. The 307 redirect command is a command that may instruct the PC 50 to transmit a request, in which a predetermined request address may be designated. In the predetermined request address, the host portion of the request address of the request received in Step S10 may comprise the IP address of the printer 10, rather than the host name of the printer 10. For example, when the request address of the request received in Step S10 is "http://host_name.com/top_page.html," the process may proceed to Step S18 and the command supplying device 32 may supply, to the PC 50 a 307 redirect command that may provide an instruction for the PC 50 to transmit a request in which "http://10.20.30.40/top_page.html" may be designated as a request address. Upon completion of Step S18, the process may return to Step S10.

In Step S18, particular embodiments may supply a 307 redirect command (e.g., a HTTP/1.1 307 Temporary Redirect Command) for temporarily changing the request address. Alternatively, in Step S18, particular embodiments may supply a 301 redirect command (e.g., a HTTP/1.1 301 Moved Permanently Command) for permanently changing the request address. Other embodiments described herein also may supply a 301 redirect command, rather than a 307 redirect command. Alternatively, commands, such as a "302 Found" command and a "303 See Other" command, may be used instead of a 307 redirect command. Moreover, in certain configurations, a hypertext markup language ("HTML") tag for redirection may be used instead of one of the above-described 300-level commands.

In Step S20, the determining device 34 may determine whether the request received in Step S10 is a submit request containing a password. When the request received in Step S10 is a submit request (YES in Step S20), the process may proceed to Step S22. When the request received in Step S10 is not a submit request (NO in Step S20), the process may proceed instead to Step S24.

In Step S22, the determining device 34 may determine whether the password contained in the submit request matches a password registered in advance in the printer 10 (e.g., a password registered in advance by the user). In certain configurations, a password common to all users may be registered in the printer 10, rather than a password unique to each user. When the password does not match the registered password (NO in Step S22), the process may proceed to Step S24. When the password matches the registered password (YES in Step S22), the process may proceed to Step S26.

In Step S24, the web-page transmitting device 40 (depicted in FIG. 1) may transmit data representing a login page, such as "login.html," to the PC 50. The login page may have the same configuration as that described above in association with the example of communications depicted in FIG. 2. Upon completion of Step S24, the process may return to Step S10.

In Step S26, the web-page transmitting device 40 may transmit to the PC 50 data representing a web page (e.g., data representing the top page: "top_page.html") corresponding to the request address of the previous request received immediately before the submit request. In Step S26, the information transmitting device 38 (depicted in FIG. 1) also may transmit to the PC 50 authentication cookie information comprising an authentication cookie (e.g., a predetermined character string) and a path. Consequently, the PC 50 may store the authentication cookie in its memory. Upon completion of Step S26, the process may return to Step S10.

When the receiving device 30 receives a request (YES in Step S10) and when the authentication cookie has been received with the request (YES in Step S12), the process may proceed to Step S28. In Step S28, the web-page transmitting device 40 may transmit to the PC 50 data representing a web page (e.g., data representing a status page: "status_page.html") corresponding to the request address of the request received in Step S10. Upon completion of Step S28, the process may return to Step S10.

[Example Communications of Embodiments of FIGS. 1, 3, and 4]

With reference to FIG. 4, a description now is given of examples of communications enabled by the web server process depicted in FIG. 3. FIG. 4 depicts communications that take place after establishment of a communication session and does not depict name resolution and establishment of a communication session. Similarly, the descriptions of other embodiments below (e.g., embodiments depicted in FIGS. 6, 7, and 9) also describe communications that take place after establishment of a communication session.

[Case A1]

In a Case A1, a host name of the printer 10: "host_name.com" may contain an underscore. The PC 50 may transmit to the printer 10 a request R11 designating a request address, such as "http://host_name.com/top_page.html," containing the host name of the printer 10. The receiving device 30 of the printer 10 may receive the request R11. Referring to FIG. 3, the determining device 34 may make a negative determination in Step S12 (NO in Step S12), a positive determination in Step S14 (YES in Step S14), and a positive determination in Step S16 (YES in Step S16). Consequently, the process may proceed to Step S18 of FIG. 3, and the command supplying device 32 may supply a 307 redirect command to the PC 50.

In accordance with the 307 redirect command, the PC 50 may transmit to the printer 10 a request R12 designating a request address, such as "http://10.20.30.40/top_page.html," containing the IP address of the printer 10. The receiving device 30 of the printer 10 may receive the request R12. Referring to FIG. 3, the determining device 34 may make a negative determination in Step S12 (NO in Step S12), a negative determination in Step S14 (NO in Step S14), and a negative determination in Step S20 (NO in Step S20). Consequently, the process may proceed to Step S24 of FIG. 3, and the web-page transmitting device 40 may transmit data representing a login page (e.g., "login.html") to the PC 50.

While viewing the login page (depicted in FIG. 2), the user of the PC 50 may enter a password on the PC 50 and may select the "Submit" button. The PC 50 may transmit a submit request R13 containing the password to the printer 10. A request address of the submit request R13 may be an address corresponding to a program for executing Steps S22, S24, and S26 of FIG. 3. To designate this request address, the web-page transmitting device 40 of the printer 10 may transmit a predetermined instruction to the PC 50, when transmitting the data representing the login page to the PC 50.

The receiving device 30 of the printer 10 may receive the submit request R13. Referring to FIG. 3, the determining device 34 may make a negative determination in Step S14 (NO in Step S14) and a positive determination in Step S20 (YES in Step S20), and the process may proceed to Step S22. When a proper password has been received, the determining device 34 may make a positive determination in Step S22 (YES in Step S22), and the process may proceed to Step S26. In Step S26 of FIG. 3, the information transmitting device 38 may transmit authentication cookie information comprising an authentication cookie and a path to the PC 50, and the web-page transmitting device 40 may transmit data representing a top page (e.g., "top_page.html") to the PC 50.

The PC 50 may store, in its memory, a combination of the authentication cookie comprised in the authentication cookie information received from the printer 10 and the IP address (e.g., "10.20.30.40") of the printer 10 contained in the request address of the request R12. Because information combined with the authentication cookie does not contain an underscore, the PC 50 may store the authentication cookie.

While viewing the top page (depicted in FIG. 2), the user of the PC 50 may select the "Status" button. In response to the selection of the "Status" button, the PC 50 may transmit to the printer 10 a request R14 comprising a request address, such as "http://10.20.30.40/status_page.html," for requesting a status page. The authentication cookie information received from the printer 10 may specify a path along which the authentication cookie may be used. The path may contain a character string, such as "status_page.html." Accordingly, when transmitting the request R14 to the printer 10, the PC 50 also may transmit the authentication cookie to the printer 10.

The receiving device 30 of the printer 10 may receive the request R14. The determining device 34 may make a positive determination in Step S12 (YES in Step S12) of FIG. 3, and the process may proceed to Step S28. In Step S28 of FIG. 3, the web-page transmitting device 40 may transmit data representing the status page (e.g., "status_page.html") to the PC 50.

[Case A2]

In a Case A2, the host name of the printer 10 may be "hostname.com." In Cases B2 and C2 (depicted in FIGS. 7 and 9, respectively, and described below), the host name of the printer 10 also may be "hostname.com." The host name, such as "hostname.com," may not contain an underscore. Consequently, when the printer 10 receives a request R11' from the PC 50, the determining device 34 may make a negative determination in Step S12 (NO in Step S12), a positive determination in Step S14 (YES in Step S14), a negative determination in Step S16 (NO in Step S16), and a negative determination in Step S20 (NO in Step S20) in FIG. 3, and the process may proceed to Step S24. In Step S24 of FIG. 3, the web-page transmitting device 40 may transmit data representing the login page (e.g., "login.html") to the PC 50. Accordingly, in the Case A2, the command supplying device 32 may not supply a 307 redirect command to the PC 50. When a submit request R13' containing a password subsequently is transmitted from the PC 50 to the printer 10, the information transmitting device 38 may transmit authentication cookie information comprising an authentication cookie and a path to the PC 50, and the web-page transmitting device 40 may transmit data representing the top page (e.g., "top_page.html") to the PC 50.

The PC 50 may store in the memory of the PC 50 a combination of the authentication cookie comprised in the authentication cookie information received from the printer 10 and the host name, such as "hostname.com," of the printer 10 contained in a request address of the request R11'. Because information stored with the authentication cookie does not contain an underscore, the PC 50 may store the authentication cookie. The operations thereafter may follow a process similar to the process described above with respect to the Case A1.

Advantages of Embodiments of FIGS. 1, 3, and 4

In the communication system 2 depicted in FIGS. 3 and 4, when the printer 10 receives the request R11 designating a request address containing a host name of the printer 10, the printer 10 may supply a 307 redirect command to the PC 50. The 307 redirect command may instruct the PC 50 to transmit the request R12 designating a request address containing an IP address of the printer 10. When the printer 10 receives the request R12 from the PC 50, the printer 10 may transmit authentication cookie information to the PC 50, such that the PC 50 may store therein a combination of an authentication cookie and the IP address of the printer 10. Consequently, even when a combination of the authentication cookie and the host name of the printer 10 may not be stored on the PC 50, the authentication cookie may be stored properly on the PC 50 with the IP address of the printer 10. Therefore, it may be possible to avoid the inconvenience associated with the examples of communication depicted in FIG. 2 and described above, in which the user of the PC 150 may be prompted to enter the password each time a request for a web page is transmitted from the PC 150. In the communication depicted in FIGS. 3 and 4, the printer 10 and the PC 50 properly may execute management of information about a web page (e.g., communication of a status page) using the authentication cookie. In particular, because the printer 10 may execute an appropriate process whether or not the host name of the printer 10 contains an underscore (e.g., Cases A1 and A2 depicted in FIG. 3), the authentication cookie may be stored properly on the PC 50.

[Correspondences]

The printer 10 and the PC 50 are examples of "communication devices" and "external devices," respectively. The request R11 and the request R12 depicted in FIG. 4 are examples of a "first request" and a "second request," respectively. Accordingly, the character strings: "http://host_name.com/top_page.html" and "http://10.20.30.40/top_page.html" are examples of a "first address" and a "second address," respectively. The 307 redirect may is an example of a "first command." The authentication cookie information, which comprises an authentication cookie and a path and may be transmitted from the printer 10 to the PC 50 in the Case A1 of FIG. 4, is an example of "first information." The authentication cookie information, which comprises an authentication cookie and a path and may be transmitted from the printer 10 to the PC 50 in the Case A2 of FIG. 4, is an example of "second information." The top page, the status page, and the login page are examples of a "first web page," a "second web page," and a "specific web page," respectively.

Figure 5:
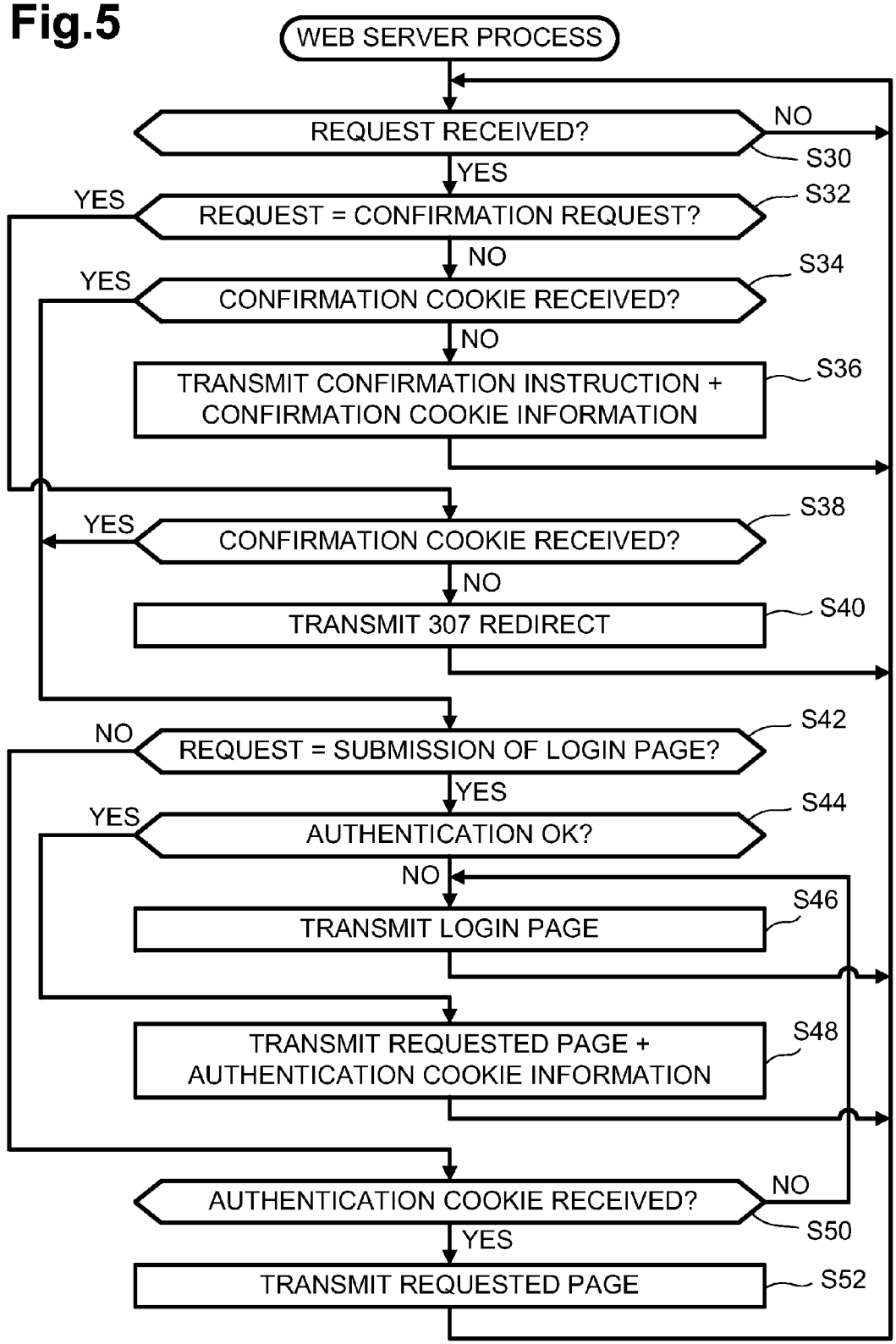
FIG. 5 is a flowchart of a web server process according to certain embodiments of the invention.
Figure 6:
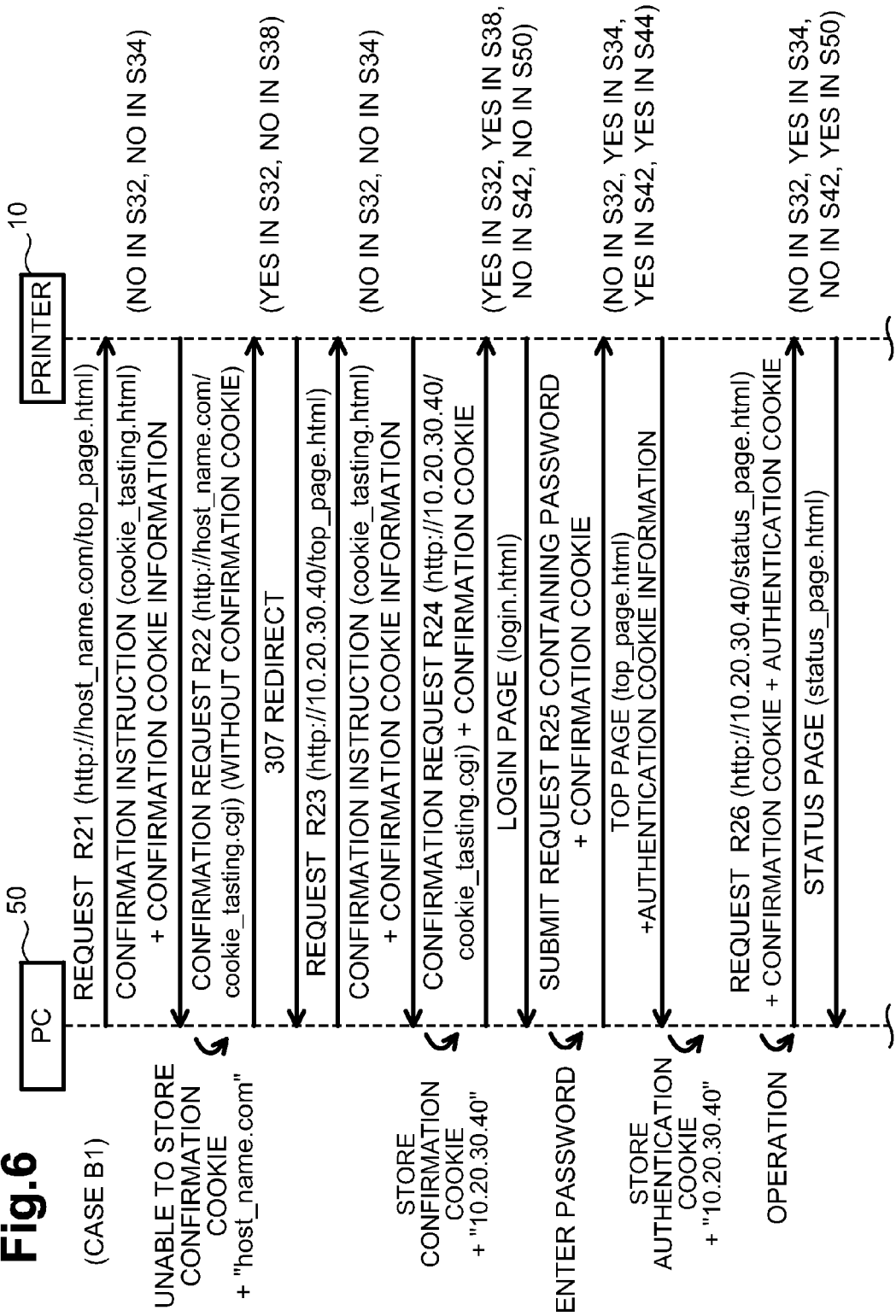
FIG. 6 is a sequence diagram depicting an example of communications according to embodiments of FIG. 5, wherein the example is based on Case B1 (described below).
Figure 7:
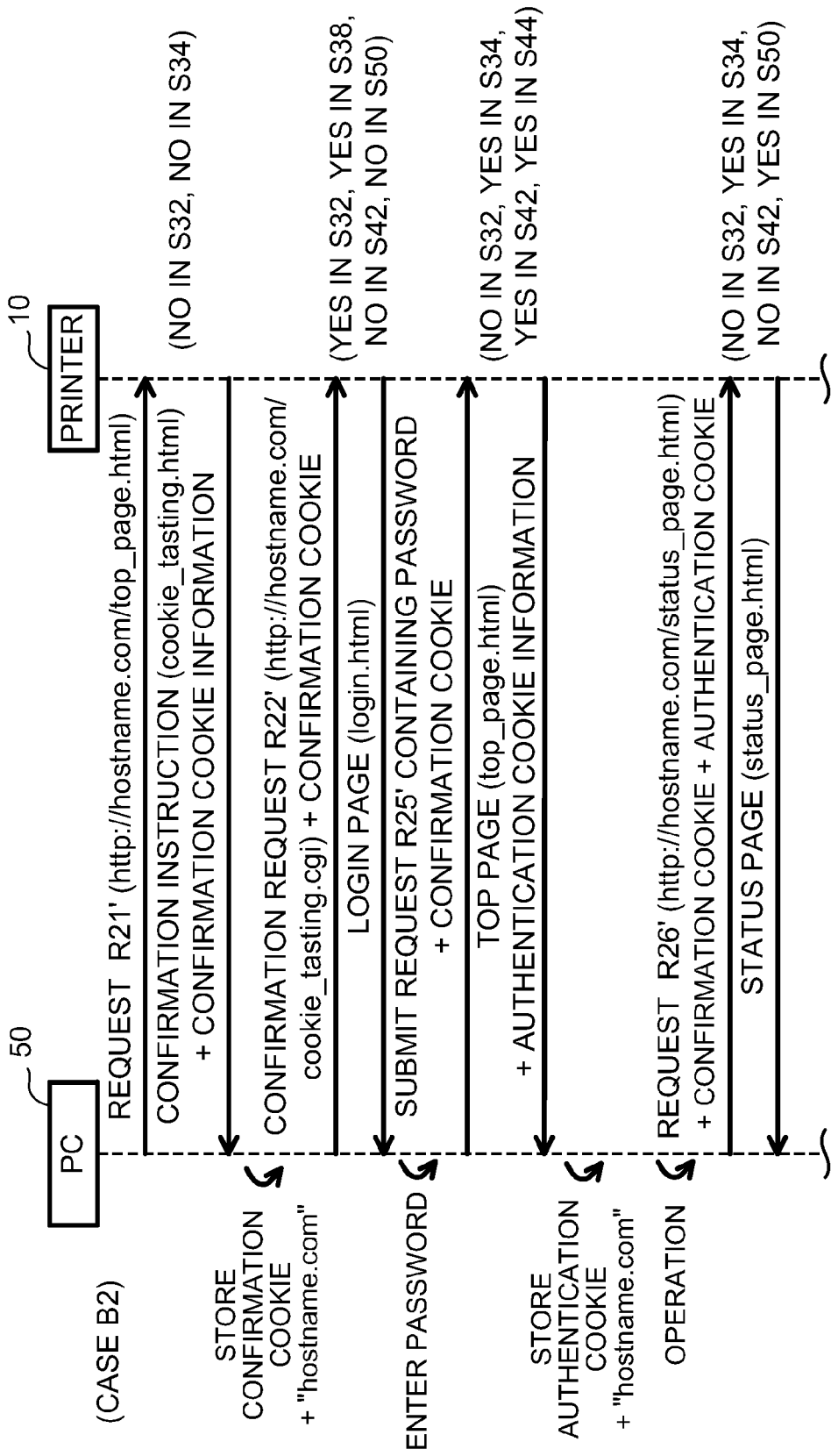
FIG. 7 is a sequence diagram depicting an example of communications according to embodiments of FIG. 5, wherein the example is based on Case B2 (described below).

Embodiments of FIGS. 5, 6, and 7

A web server process depicted in FIGS. 5, 6, and 7 differs from that depicted in FIGS. 1, 3, and 4 and described above. The web server process of FIGS. 5, 6, and 7 now is described with reference to FIG. 5. Step S30 may be the same as Step S10 of FIG. 3. In Step S32, the confirming device 36 (depicted in FIG. 1) may determine whether the request received from the PC 50 in Step S30 is a confirmation request. Specifically, when a request address of the request received in Step S30 is a specific address (e.g., "cookie_tasting.cgi"), the confirming device 36 may make a positive determination in Step S32 (YES in Step S32), and the process may proceed to Step S38. When the request address of the request received in Step S30 is not the specific address, the confirming device 36 may make a negative determination in Step S32 (NO in Step S32), and the process may proceed to Step S34.

In Step S34, the confirming device 36 may determine whether a confirmation cookie has been received with the request. The confirmation cookie may be transmitted to the PC 50 in Step S36 (described below). When the confirmation cookie has not been received with the request (NO in Step S34), the process may proceed to Step S36. When the confirmation cookie has been received with the request (YES in Step S34), the process may proceed to Step S42.

In Step S36, the confirming device 36 may transmit a confirmation instruction (e.g., "cookie_tasting.html") and confirmation cookie information, which comprises the confirmation cookie (e.g., a character string) and a path, to the PC 50. The confirmation instruction may instruct the PC 50 to store the confirmation cookie. According to the confirmation instruction, the PC 50 may attempt to store the confirmation cookie in the memory of PC 50. In accordance with the confirmation instruction, the PC 50 subsequently may transmit a confirmation request (e.g., "cookie_tasting.cgi") to the printer 10. When the confirmation cookie may be stored, the PC 50 may transmit the confirmation request and the confirmation cookie to the printer 10. When the confirmation cookie may not be stored, the PC 50 may transmit the confirmation request to the printer 10 and may not transmit the confirmation cookie. Upon completion of Step S36, the process may return to Step S30.

In Step S38, the confirming device 36 may determine whether the confirmation cookie has been received with the confirmation request. When the confirmation cookie has not been received with the confirmation request (NO in Step S38), the process may proceed to Step S40. When the confirmation cookie has been received with the confirmation request (YES in Step S38), the process may proceed to Step S42.

In Step S40, as in Step S18 of FIG. 3, the command supplying device 32 may transmit a 307 redirect command to the PC 50. Steps S42 through S48 may be substantially the same as Steps S20 through S26 of FIG. 3. Steps S50 and S52 may be substantially the same as Steps S12 and S28 of FIG. 3.

[Case B1]

With reference to FIGS. 6 and 7, a description now is given of examples of communications enabled by the web server process depicted in FIG. 5. In a Case B1, which is depicted in FIG. 6, a host name of the printer 10, such as "host_name.com," may contain an underscore. The PC 50 may transmit to the printer 10 a request R21 designating a request address containing the host name of the printer 10. Referring to FIG. 5, the confirming device 36 of the printer 10 may make a negative determination in Step S32 (NO in Step S32) and a negative determination in Step S324 (NO in Step S34). Consequently, the process may proceed to Step S36 of FIG. 5, and the confirming device 36 may transmit a confirmation instruction (e.g., "cookie_tasting.html") and confirmation cookie information to the PC 50.

In accordance with the confirmation instruction, the PC 50 may attempt to store in the memory of the PC 50 a combination of a confirmation cookie comprised in the confirmation cookie information, which is received from the printer 10, and the host name of the printer 10, which is contained in the request address of the request R21. Nevertheless, because information to be stored with the confirmation cookie may contain an underscore, the PC 50 may not be able to store the confirmation cookie in the memory. When the PC 50 is not able to store the confirmation cookie in the memory, the PC 50 may transmit a confirmation request R22 (e.g., "http://host_name.com/cookie_tasting.cgi") without the confirmation cookie to the printer 10 in accordance with the confirmation instruction. Accordingly, referring to FIG. 5, the confirming device 36 of the printer 10 may make a positive determination in Step S32 (YES in Step S32) and a negative determination in Step S38 (NO in Step S38). Consequently, the process may proceed to Step S40 of FIG. 5, and the command supplying device 32 may supply a 307 redirect command to the PC 50.

In accordance with the 307 redirect command, the PC 50 may transmit to the printer 10 a request R23 designating a request address containing an IP address of the printer 10. Accordingly, referring to FIG. 5, the confirming device 36 may make a negative determination in Step S32 (NO in Step S32) and a negative determination in Step S34 (NO in Step S34). Consequently, the process may proceed to Step S36 of FIG. 5, and the command supplying device 32 may transmit the confirmation instruction (e.g., "cookie_tasting.html") and the confirmation cookie information to the PC 50.

In accordance with the confirmation instruction, the PC 50 may attempt to store in the memory of the PC 50 a combination of the confirmation cookie comprised in the confirmation cookie information, which is received from the printer 10, and the IP address of the printer 10, which is contained in the request address of the request R23. Because the information combined with the confirmation cookie does not contain an underscore, the PC 50 may store the confirmation cookie in the memory. The path specified in the confirmation cookie information may contain the character string, such as "cookie_tasting.cgi." Therefore, when transmitting a confirmation request R24 (e.g., "http://10.20.30.40/cookie_tasting.cgi") to the printer 10, the PC 50 may transmit the confirmation cookie to the printer 10. Referring to FIG. 5, the confirming device 36 of the printer 10 may make a positive determination in Step S32 (YES in Step S32), a positive determination in Step S38 (YES in Step S38), a negative determination in Step S42 (NO in Step S42), and a negative determination in Step S50 (NO in Step S50). Consequently, the process may proceed to Step S46 of FIG. 5, and the web-page transmitting device 40 may transmit data representing a login page (e.g., "login.html") to the PC 50.

The PC 50 may transmit a submit request R25 containing a password to the printer 10. A request address of the submit request R25 may be an address corresponding to a program for executing Steps S44, S46, and S48 of FIG. 5. To designate this request address, the web-page transmitting device 40 of the printer 10 may transmit a predetermined instruction to the PC 50 when transmitting data representing the login page to the PC 50. The path specified in the confirmation cookie information may contain the request address of the submit request R25. Therefore, the PC 50 may transmit the confirmation cookie to the printer 10 with the submit request R25.

Referring to FIG. 5, the confirming device 36 of the printer 10 may make a negative determination in Step S32 (NO in Step S32), a positive determination in Step S34 (YES in Step S34), and a positive determination in Step S42 (YES in Step S42). When a proper password has been received, the confirming device 36 may make a positive determination in Step S44 (YES in Step S44). Consequently, the process may proceed to Step S48 of FIG. 5, and the information transmitting device 38 may transmit authentication cookie information comprising an authentication cookie and a path to the PC 50, and the web-page transmitting device 40 may transmit data representing a top page (e.g., "top_page.html") requested in the request R23 to the PC 50.

The PC 50 may store in the memory of the PC 50 a combination of the authentication cookie comprised in the authentication cookie information, which is received from the printer 10, and the IP address of the printer 10, which is contained in the request R23. The PC 50 may store the authentication cookie because the information combined with the authentication cookie does not contain an underscore.

While viewing the top page (depicted in FIG. 2), the user of the PC 50 may select the "Status" button. In response to the selection of the "Status" button, the PC 50 may transmit to the printer 10 a request R26 designating a request address, such as "http://10.20.30.40/status_page.html," for requesting a status page. The path specified in the confirmation cookie information and the path specified in the authentication cookie information each contain the character string, such as "status_page.html." Therefore, when transmitting the request R26, the PC 50 may transmit both the confirmation cookie and the authentication cookie to the printer 10. Referring to FIG. 5, the confirming device 36 of the printer 10 may make a negative determination in Step S32 (NO in Step S32), a positive determination in Step S34 (YES in Step S34), a negative determination in Step S42 (NO in Step S42), and a positive determination in Step S50 (YES in Step S50). Consequently, the process may proceed to Step S52 of FIG. 5, and the web-page transmitting device 40 may transmit data representing the status page (e.g., "status_page.html") to the PC 50. In a modification, a path stored with a confirmation cookie may be set, such that the confirmation cookie may not be transmitted with the request R26.

[Case B2]

In a Case B2, which is depicted in FIG. 7, the host name of the printer 10: "hostname.com" of the printer 10 may not contain an underscore. Consequently, when the PC 50 transmits a request R21' to the printer 10, the printer 10 may transmit a confirmation instruction and confirmation cookie information to the PC 50, and the PC 50 may store a combination of a confirmation cookie and the host name of the printer 10 in the memory of the PC 50. When transmitting a confirmation request R22' (e.g., "http://hostname.com/cookie_tasting.cgi") to the printer 10 according to the confirmation instruction, the PC 50 may transmit the confirmation cookie to the printer 10. The subsequent communication may be substantially the same as that in the Case B1 of FIG. 6. Similar to the process of transmitting requests R25 and R26 depicted in FIG. 6, the PC 50 may transmit sequentially a submit request R25' and a request R26' to the printer 10. In addition, the printer 10 may transmit sequentially a login page, a top page, and a status page to the PC 50. In the Case B2, the command supplying device 32 may not supply a 307 redirect command to the PC 50.

Advantages of Embodiments of FIGS. 5, 6, and 7

In the embodiments of FIGS. 5, 6, and 7, as in the embodiments of FIGS. 1, 3, and 4, when a combination of the authentication cookie and the host name of the printer 10 may not be stored on the PC 50, a combination of the authentication cookie and the IP address of the printer 10 may be stored on the PC 50. Because the printer 10 may execute an appropriate process based on whether the confirmation cookie has been received from the PC 50 (e.g., the Case B1 of FIG. 6 and the Case B2 of FIG. 7), the PC 50 may store the authentication cookie therein.

Additionally, in the embodiments of FIGS. 5, 6, and 7, the printer 10 may make a negative determination in Step S38 (NO in Step S38 of FIG. 5) when a cookie may not be stored on the PC 50 because an underscore is contained in the host name and when a cookie may not be stored on the PC 50 for another reason, and the printer 10 may transmit a 307 redirect command to the PC 50 in Step S40 of FIG. 5. Accordingly, the printer 10 may enable the PC 50 to store the authentication cookie in both the above-described scenarios. In the embodiments of FIGS. 5, 6, and 7, the confirmation cookie is an example of a "second cookie."

Figure 8:
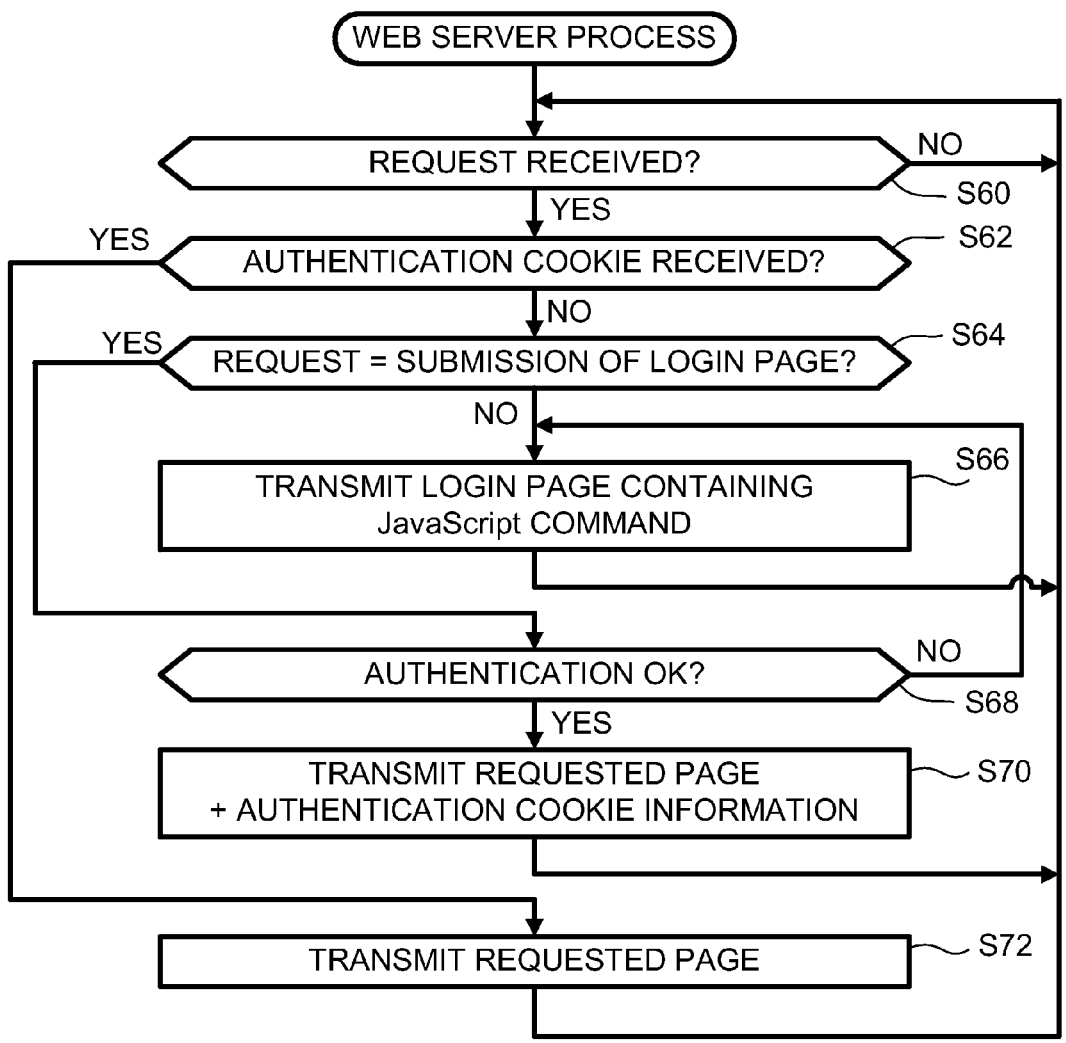
FIG. 8 depicts a flowchart of a web server process according to further embodiments of the invention.

Embodiments of FIGS. 8 and 9

A web server process depicted in FIGS. 8 and 9 may differ from those depicted in FIGS. 3 through 7 and described above. In FIGS. 5, 6, and 7, the confirming device 36 of the printer 10 may transmit a confirmation cookie to the PC 50 and may cause the PC 50 to transmit the confirmation cookie back to the printer 10 (Step S36 of FIG. 5). Thereby, the confirming device 36 may determine whether the PC 50 may store the confirmation cookie. According to FIGS. 8 and 9, however, the confirming device 36 of the printer 10 may transmit a JavaScript® command (JavaScript® is a registered trademark owned by Oracle of America, Inc. of Redwood Shores, Calif.) to the PC 50 and may cause the PC 50 to determine whether a confirmation cookie may be stored.

The web server process depicted in FIGS. 8 and 9 now is described with reference to FIG. 8. Steps S60, S62, and S64 may be substantially the same as Steps S10, S12, and S20 of FIG. 3. In Step S66, the web-page transmitting device 40 may transmit data representing a login page (e.g., "login.html") to the PC 50. At the same time, the confirming device 36 may transmit a JavaScript® command to the PC 50.

The JavaScript® command may instruct the PC 50 to execute the following processes: (1) a process for attempting to store a confirmation cookie; (2) a process for reading out the confirmation cookie; (3) a process for transmitting a request to the printer 10 when the confirmation cookie may not be read out (e.g., when the PC 50 may not store the confirmation cookie), wherein the request designates a request address, such as "http://10.20.30.40/top_page.html" or "http://10.20.30.40/login.html," containing an IP address of the printer 10; and (4) a process for displaying a login page when the confirmation cookie may be read out. Upon completion of Step S66, the process may return to Step S60. Steps S68, S70, and S72 may be substantially the same as Steps S22, S26, and S28 of FIG. 3.

[Case C1]

With reference to FIG. 9, a description now is given of examples of communications enabled by the webserver process depicted in FIG. 8. In a Case C1, a host name of the printer 10: "host_name.com" may contain an underscore. The PC 50 may transmit to the printer 10 a request R31 designating a request address containing the host name of the printer 10. Referring to FIG. 8, the confirming device 36 of the printer 10 may make a negative determination in Step S62 (NO in Step S62) and a negative determination in Step S64 (NO in Step S64). Consequently, the process may proceed to Step S66 of FIG. 8, and the web-page transmitting device 40 may transmit data representing a login page (e.g., "login.html") to the PC 50, and the confirming device 36 may transmit a JavaScript® command to the PC 50.

In accordance with the above-described processes (1) and (2) of the JavaScript® command, the PC 50 may execute the processes for storing a confirmation cookie and for reading out the confirmation cookie. Because information combined with the confirmation cookie (e.g., the host name of the printer 10 contained in the request address of the request R31) contains an underscore, the PC 50 may not be able to store the confirmation cookie in the memory, and the PC 50 may not be able to read out the confirmation cookie. In accordance with the above-described process (3) of the JavaScript® command, the PC 50 may transmit to the printer 10 a request R32 designating a request address, such as "http://10.20.30.40/top_page.html." Referring to FIG. 8, when the PC 50 transmits the request R32 to the printer 10, the confirming device 36 of the printer 10 may make a negative determination in Step S62 (NO in Step S62) and a negative determination in Step S64 (NO in Step S64), and the confirming device 36 may execute the operation of Step S66 again.

The PC 50 may execute the processes for storing and reading out the confirmation cookie again. Because information to be stored with the confirmation cookie (e.g., the IP address of the printer 10 contained in the request address of the request R32) may not contain an underscore, the PC 50 may store the confirmation cookie in the memory of the PC 50. The PC 50 subsequently may read out the confirmation cookie and display the login page in accordance with the above-described process (4) of the JavaScript® command.

The PC 50 may transmit a submit request R33 containing a password to the printer 10. A request address of the submit request R33 may correspond to a program for executing Steps S66, S68, and S70 of FIG. 8. To designate the request address, the web-page transmitting device 40 of the printer 10 may transmit a predetermined instruction to the PC 50 when transmitting the data representing the login page to the PC 50.

After confirming that a confirmation cookie may be stored, the confirmation cookie may be deleted. Therefore, when transmitting the submit request R33 to the printer 10, the PC 50 may not transmit the confirmation cookie to the printer 10, which may reduce the amount of data communication between the PC 50 and the printer 10. Alternatively, the confirmation cookie may not be deleted, even after confirming that a confirmation cookie may be stored. In this alternative configuration, the confirmation cookie may be transmitted with the submit request R33. Referring to FIG. 8, when the submit request R33 is transmitted from the PC 50 to the printer 10, the confirming device 36 of the printer 10 may make a negative determination in Step S62 (NO in Step S62) and a positive determination in Step S64 (YES in Step S64). When a proper password is received, the confirming device 36 may make a positive determination in Step S68 (YES in Step S68). Consequently, the process may proceed to Step S70 of FIG. 8, and the information transmitting device 38 may transmit authentication cookie information comprising an authentication cookie and a path to the PC 50, and the web-page transmitting device 40 may transmit data representing a top page (e.g., "top_page.html") requested in request R32 to the PC 50.

The PC 50 may store in the memory of the PC 50 a combination of the authentication cookie comprised in the authentication cookie information, which is received from the printer 10, and the IP address of the printer 10, which is contained in the request address of the request R32. Because information combined with the authentication cookie may not contain an underscore, the PC 50 may store the authentication cookie.

While viewing the top page (depicted in FIG. 2), the user of the PC 50 may select the "Status" button. In response to the selection of the "Status" button, the PC 50 may transmit to the printer 10 a request R34 designating a request address, such as "http://10.20.30.40/status_page.html," for requesting a status page. Similarly to the processes depicted in FIGS. 3 through 7, the PC 50 may transmit the authentication cookie along with the request R34 to the printer 10. The confirming device 36 of the printer 10 may make a positive determination in Step S62 (YES in Step S62 of FIG. 8). Consequently, the process may proceed to Step S72 of FIG. 8, and the web-page transmitting device 40 may transmit data representing a status page (e.g., "status_page.html") to the PC 50.

[Case C2]

In a case C2, the host name of the printer 10, such as "hostname.com," may not contain an underscore. When the PC 50 transmits a request R31' to the printer 10, the printer 10 may transmit a JavaScript® command to the PC 50, and the PC 50 may store a combination of a confirmation cookie and the host name of the printer 10 in the memory of the PC 50. The PC 50 may display a login page in accordance with the above-described process (4) of the JavaScript® command. The subsequent communications may be substantially the same as the communications in the Case C1. Similar to the process of transmitting requests R33 and R34, the PC 50 may transmit sequentially a submit request R33' and a request R34' to the printer 10. The printer 10 may transmit sequentially a top page and a status page to the PC 50.

Advantages of Embodiments of FIGS. 8 and 9

The embodiments of FIGS. 8 and 9 may achieve advantages substantially similar to those depicted in FIGS. 3 through 7 and described above. In FIGS. 8 and 9, the above-described process (3) of the JavaScript® command is an example of a "first command." The entire JavaScript® command is an example of a "second command."

Although specific examples depicted in FIGS. 8 and 9 have been described in detail, these are merely examples and are not intended to limit the claims. The processes and apparatus described in the claims also may comprise those processes and apparatus obtained by making various modifications and changes to the above-described examples. Examples of modifications of embodiments now are described.

[Particular Modifications]

In a modification to foregoing embodiments, the "communication device" may not be the printer 10 and may be another device having a web server function (e.g., server, facsimile machine, copier, scanner, or multifunction peripheral). The "external device" may not be the PC 50 and may be another device having a web client function (e.g., mobile phone or personal digital assistant ("PDA")).

[Certain Modifications]

In a modification to foregoing embodiments, the "first web page" may not be a top page and may be another type of page (e.g., login page). The "second web page" may not be a status page and may be another type of page (e.g., top page).

[Other Modifications]

In foregoing embodiments, a cookie stored on the PC 50 may be used for authentication for transmission of a web page from the printer 10 to the PC 50. Alternatively, for example, when accessing a web page for shopping, the PC 50 may store, as a cookie, information representing a product selected by a user. The "first cookie" may not be an authentication cookie and may be another type of cookie. The "first cookie" may correspond to many types of information that may be stored as a cookie on the external device.

[Still Other Modifications]

In foregoing embodiments, the information transmitting device 38 of the printer 10 may transmit an authentication cookie (e.g., Step S26 of FIG. 3, Step S48 of FIG. 5, and Step S70 of FIG. 8). Alternatively, the information transmitting device 38 may transmit to the PC 50 a command (e.g., a command described in the JavaScript® programming language) that may instruct the PC 50 to generate an authentication cookie. The PC 50 may store an authentication cookie generated by the PC 50 itself. The "first information" may comprise the "first cookie" similar to above-described embodiments, or the "first information" may comprise information for generating the "first cookie," as described in the present modifications. Similarly, the "second information" may comprise the "first cookie," or the "second information" may comprise information for generating the "first cookie," as in the present modifications.

[Yet Other Modifications]

In foregoing embodiments, a cookie may not be stored on the PC 50 when the host name contains an underscore. The technique of foregoing embodiments may be applicable when a cookie may not be stored because the host name contains a different symbol, other than an underscore. For example, in Step S16 of FIG. 3, the determining device 34 of the printer 10 may determine whether the host name contains the different symbol. As described herein, the term: "symbol" refers to a symbol in a broad sense that comprises characters (e.g., letters and numbers).

[Additional Modifications]

In above-described embodiments, the CPU 22 of the printer 10 may function as the components 30 through 40 (depicted in FIG. 1) when executing processes according to one or more software programs stored therein. Alternatively, at least some of the components 30 through 40 may be realized by hardware, such as a logic circuit.

While the invention has been described in connection with various example structures and illustrative embodiments, it will be understood by those skilled in the art that other variations and modifications of the structures, configurations, and embodiments described above may be made without departing from the scope of the invention. For example, this application comprises any possible combination of the various elements and features disclosed herein, and the particular elements and features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or practice of the invention disclosed herein. It is intended that the specification and the described examples are illustrative with the true scope of the invention being defined by the following claims.

What is claimed is:

1. A communication device, comprising:
   a processor; and
   a memory configured to store computer-readable instructions thereon, wherein the computer-readable instructions instruct the processor to operate as:
   a receiving device configured to receive a request from an external device;
   a command supplying device configured to determine that a request received by the receiving device is a first request when the request comprises a first address designated as an address for requesting a first web page and the first address comprises a specific host name assigned to the communication device,
      wherein the command supplying device is further configured to transmit a first command to the external device when the receiving device receives the first request from the external device and a first condition is satisfied, the first command comprises an instruction for the external device to transmit a second request to the communication device when a second condition is satisfied, and
      wherein the command supplying device is further configured to determine that a request received by the receiving device is the second request when the request comprises a second address designated as an address for requesting the first web page and the second address comprises a specific IP address assigned to the communication device;
   an information transmitting device configured to transmit first information to the external device when the receiving device receives the second request from the external device and a third condition is satisfied,
      wherein a combination of the specific IP address and a first cookie is stored on the external device when the first information is received from the communication device; and
   a web-page transmitting device configured to transmit first data representing the first web page to the external device when the receiving device receives the second request from the external device.

2. The communication device according to claim 1,
   wherein the command supplying device is configured to transmit the first command to the external device when the receiving device receives the first request from the external device and the specific host name contains a predetermined symbol,
   wherein the command supplying device is configured not to transmit the first command to the external device when the receiving device receives the first request from the external device and the specific host name does not contain the predetermined symbol,
   wherein the information transmitting device is configured to transmit second information to the external device when the receiving device receives the first request from the external device and the specific host name does not contain the predetermined symbol,
   wherein a combination of the specific host name and the first cookie is stored on the external device when the second information is received from the communication device, and
   wherein the web-page transmitting device transmits the first data representing the first web page to the external device when the receiving device receives the first request from the external device and the specific host name does not contain the predetermined symbol.

3. The communication device according to claim 2, wherein the predetermined symbol comprises an underscore.

4. The communication device according to claim 1, wherein the command supplying device comprises:
   a confirming device configured to instruct the external device to execute a confirmation process when the receiving device receives the first request from the external device,
   wherein the confirmation process comprises determining whether a combination of the specific host name and a second cookie may be stored on the external device, and
   wherein the first command is an instruction for the external device to transmit a second request to the communication device when, as a result of the confirmation process, it is determined that the combination of the specific host name and the second cookie cannot be stored in the external device.

5. The communication device according to claim 4,
   wherein the confirming device is configured to instruct the external device to execute the confirmation process by transmitting the second cookie to the external device and instructing the external device to store the combination of the specific host name and the second cookie when the second cookie is received from the communication device,
   wherein the command supplying device is configured to transmit the first command to the external device when the second cookie is not stored on the external device after the confirming device transmits the second cookie to the external device,
   wherein the command supplying device is configured not to transmit the first command to the external device when the second cookie is stored on the external device after the confirming device transmits the second cookie to the external device,
   wherein the information transmitting device is configured to transmit second information to the external device when the second cookie is stored on the external device after the confirming device transmits the second cookie to the external device, wherein a combination of the specific host name and the first cookie is stored on the external device when the second information is received from the communication device, and wherein the web-page transmitting device is configured to transmit the first data representing the first web page to the external device when the second cookie is stored on the external device after the confirming device transmits the second cookie to the external device.

6. The communication device according to claim 4, wherein the confirming device is configured to instruct the external device to execute the confirmation process by transmitting a second command to the external device when the receiving device receives the first request from the external device, and wherein the second command comprises the first command.

7. The communication device according to claim 1, wherein the web-page transmitting device is further configured to transmit specific data to the external device when the second request is received from the external device, wherein the specific data represents a specific web page for input of authentication information, wherein the information transmitting device is configured to transmit the first information to the external device when the communication device receives predetermined authentication information from the external device after the web-page transmitting device transmits the specific data to the external device, and wherein the web-page transmitting device is configured to transmit the first data to the external device when the communication device receives the predetermined authentication information from the external device after the web-page transmitting device transmits the specific data to the external device.

8. The communication device according to claim 1, wherein the web-page transmitting device is further configured to transmit second data representing a second web page to the external device when the receiving device receives a request for a second web page accompanying the first cookie from the external device after the information transmitting device transmits the first information to the external device.

9. A non-transitory, computer-readable storage medium storing computer-readable instructions for a processor of a communication device, the computer-readable instructions instructing the processor to perform steps comprising:

receiving a request from an external device;

determining that a request received from an external device is a first request when the request comprises a first address designated as an address for requesting a web page and the first address comprises a specific host name assigned to the communication device;

transmitting a command to the external device when the first request is received from the external device, the command comprising an instruction for the external device to transmit a second request to the communication device;

determining that a request received by the receiving device is the second request when the request comprises a second address designated as an address for requesting the web page and the second address comprises a specific IP address assigned to the communication device;

transmitting information to the external device when the second request is received from the external device, wherein a combination of the specific IP address and a cookie is stored on the external device when the information is received from the communication device; and transmitting data representing the web page to the external device when the second request is received from the external device.

10. A communication device, comprising:

a receiver configured to receive a request from an external device;

a command supplying device configured to determine that a request received by the receiver is a first request when the request comprises a first address designated as an address for requesting a web page and the first address comprises a specific host name assigned to the communication device, wherein the command supplying device is further configured to transmit a command to the external device when the receiver receives the first request from the external device, the command comprising an instruction for the external device to transmit a second request to the communication device, and wherein the command supplying device is further configured to determine that a request received by the receiver is a second request when the request comprises a second address designated as an address for requesting the web page and the second address comprises a specific IP address assigned to the communication device;

an information transmitter configured to transmit information to the external device when the receiver receives the second request from the external device, wherein a combination of the specific IP address and a cookie is stored on the external device when the information is received from the communication device; and a web-page transmitter configured to transmit data representing the web page to the external device when the receiver receives the second request from the external device.

\* \* \* \* \*